United States Patent

[11] 3,628,144

| [72] | Inventors | Jesse Aronstein<br>Latham;<br>Richard J. Gunthert, Wappingers Falls,<br>both of N.Y. |
|---|---|---|
| [21] | Appl. No. | 791,219 |
| [22] | Filed | Jan. 15, 1969 |
| [45] | Patented | Dec. 14, 1971 |
| [73] | Assignee | International Business Machines<br>Corporation<br>Armonk, N.Y. |

[54] ELECTRICAL CONTACT CLEANING DEVICE
17 Claims, 4 Drawing Figs.

[52] U.S. Cl. .................................................. 324/158 F,
51/241 R, 200/166 G, 324/158 P
[51] Int. Cl. ..................................................... G01r 31/00,
B24b 19/00, H01h 9/00
[50] Field of Search .......................................... 324/73 AT,
158, 158 F, 62, 64, 51, 157, 158 P; 339/95;
51/241, 8, 262, 266; 209/73, 75, 81; 200/166 G

[56] References Cited
UNITED STATES PATENTS

| 1,932,611 | 10/1933 | Whalen ........................ | 51/266 |
| 2,554,858 | 5/1951 | Gogel ............................ | 51/8 |
| 2,741,683 | 4/1956 | Persons ........................ | 200/166 |
| 3,032,191 | 5/1962 | Clukey ........................ | 209/75 |

Primary Examiner—Gerard R. Strecker
Assistant Examiner—Ernest F. Karlsen
Attorneys—Hanifin and Clark and Frank C. Leach, Jr.

ABSTRACT: Electric contacts, which are utilized in testing semiconductor chips or the like, become contaminated by deposits left on the contacts by the chips during testing. These contaminants are removed by cleaning means movable by the chip handling equipment. After the contacts have been cleaned, the debris is removed by an air jet.

Patented Dec. 14, 1971

INVENTORS
JESSE ARONSTEIN
RICHARD J. GUNTHERT

*Frank C. Leach Jr.*
ATTORNEY 3,628,144

ELECTRICAL CONTACT CLEANING DEVICE

In the manufacture of semiconductor devices such as transistors, diodes, and integrated circuits, for example, it is necessary to test such electrical devices to determine if the devices meet design specifications. Thus, each device is moved to one or more test stations and is subjected to different tests at each test station.

Because of the metallurgy involved in forming the semiconductor devices such as semiconductors, for example, the electrical contacts, which engage contact terminals of the chip to supply the desired voltage and/or current to the chip, become contaminated. The accumulation of the contaminants on the contact surface increases the resistance of the contact. This may cause a decrease in test accuracy whereby a satisfactory device will test unsatisfactory.

These contacts have previously been cleaned manually with an abrasive or a chemical. However, this manual cleaning has required stopping of the testing of the chips whereby the time required to test the chips is increased so that the cost of manufacture is increased. Furthermore, this type of manual cleaning has depended upon the experience of the operator as to when cleaning would be required. Accordingly, the previously available cleaning means has been particularly undesirable when an inexperienced operator is performing the test.

The present invention satisfactorily overcomes the foregoing by providing cleaning means that automatically clean each of the contact blades at each test station during each cycle of operation of the index head that carries or transports the chip from one test station to the other. Thus, there is no substantial buildup of any contaminants on the contact blades when using the automatic cleaning device of the present invention since the contact blades are cleaned during each cycle.

By automatically cleaning the contact blades during each cycle, there is no downtime of the machine for cleaning. As a result, substantial savings in labor may be accomplished when utilizing the cleaning device of the present invention. Additionally, because of the automatic cleaning of the present invention, an inexperienced operator may be employed to test the devices without the operator needing to know when cleaning would have to be performed.

The present invention also eliminates the problem of the contact blades not remaining flat and sharp edged through appropriately shaping the cleaning means. In the present invention, the cleaning means is preferably an abrasive member that is formed as a segment of a cylinder with a sufficiently large radius so that the member may advance into engagement with each of the contact blades at a low-pressure angle and still not affect the flatness or sharp-edgeness of the contact blade against which the abrasive member bears.

An object of this invention is to provide a device for cleaning electrical contacts or the like.

Another object of this invention is to provide a device for automatically cleaning electrical contacts utilized in test devices for chips or the like.

The foregoing and other objects, features, and advantages of this invention will be apparent from the following more particular description of a preferred embodiment of the invention, as illustrated in the accompanying drawings.

IN THE DRAWINGS

Figure 1:
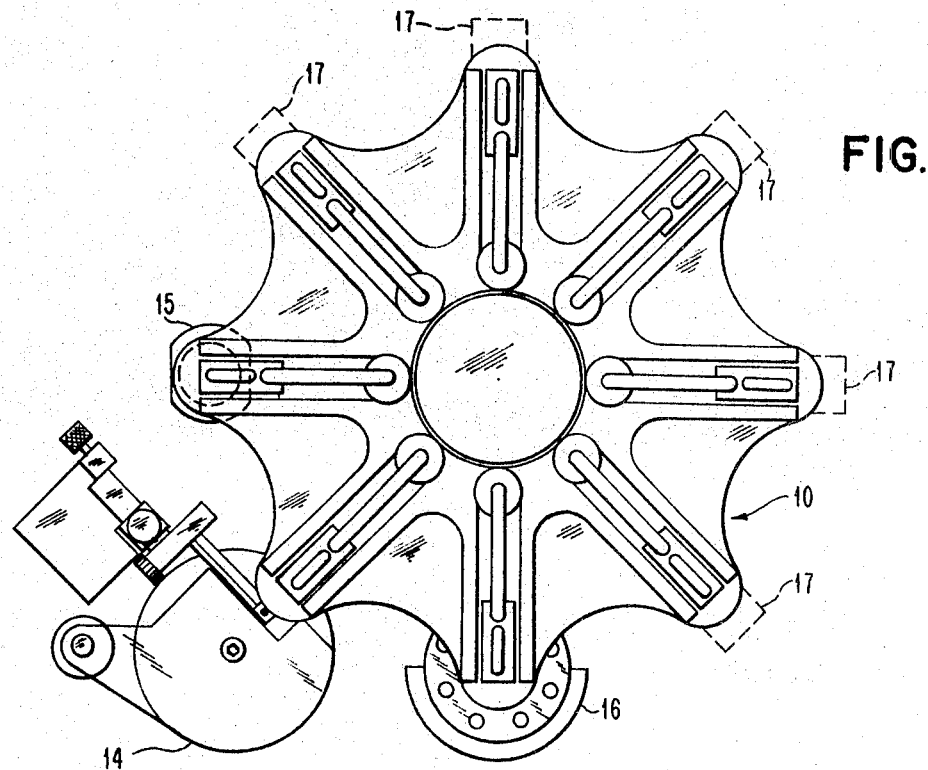
FIG. 1 is a top plan schematic view showing a rotary index head for transporting chips between various work and test stations.

Referring to the drawings and particularly FIG. 1, there is shown a rotary index head 10 that is adapted to be rotated by suitable means of the type shown and described in U.S. Pat. No. 3,367,476 to Jesse Aronstein et al. for "Orienting and Contacting Device." The head 10 has a plurality of vacuum needles or tubes 11 (see FIGS. 2 and 4) supported thereon for movement with the head 10.

Each of the vacuum needles or tubes 11 is adapted to support a semiconductor device such as a semiconductor chip 12, for example, thereon for transportation to various test and work stations. The vacuum needles 11 are mounted on the head 10 for vertical movement relative to the head 10.

As shown in FIG. 1, the work stations include a vibratory feed bowl 14, which supplies the chips 12 for pickup by the vacuum needles 11, an orientor station 15, which properly orients the chip 12 on the vacuum needle 11, and a sorter 16. The sorter 16 receives the chip 12 from the vacuum needle 11 after testing of the chip 12 has been completed at various test stations 17. The sorter 16 includes means to receive the chips 12, which have passed the tests at the various test stations 17, in one area and to receive the chips 12, which failed a test at least at one of the test stations 17, in another area.

Figure 3:
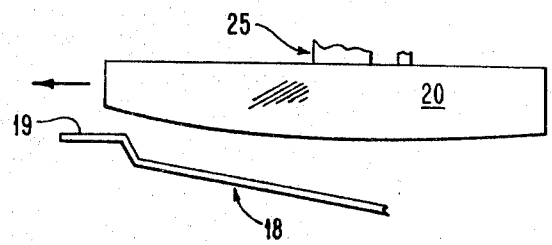
FIG. 3 is an enlarged side-elevational view of one of the contact blades and the abrasive member for cleaning the contact blade.
Figure 4:
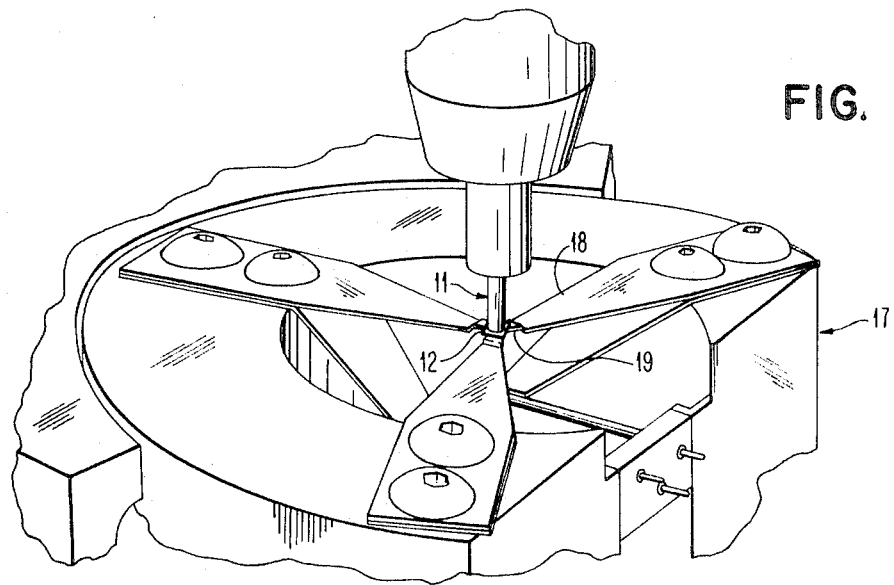
FIG. 4 is an enlarged perspective view illustrating one of the chips being tested at a test station.

Each of the test stations 17 has one or more contact blades 18 to make contact with electrical terminals on the chip 12, which is supported by the vacuum needle or tube 11. As shown in FIG. 4, the contact blades 18 are supported for engagement with the chip 12, which is disposed at the bottom of the vacuum needle or tube 11. Each of the contact blades 18 includes a raised tip portion 19 (see FIG. 3) adjacent its end; it is the raised tip portion 19 that actually makes electrical contact with an electrical connection on the chip 12.

The rotary index head 10 supports an abrasive member such as an abrasive stone 20, for example, thereon for movement with the rotary index head 10 whereby the abrasive stone 20 engages the raised tip portions 19 of the contact blades 18 to clean the portions 19 of the contact blades 18 during movement of the abrasive stone 20 over the raised tip portions 19 of the contact blades.

The abrasive stone 20 is carried on one end of a bellcrank 21, which is pivotally mounted between a pair of ears 22 and 23 on the rotary index head 10 by a pin 24. The abrasive stone 20 is fixedly secured to a U-shaped member 25, which is disposed within a slot or recess 26 in the bellcrank 21.

The U-shaped member 25 is secured to the bellcrank 21 by suitable fastening means 27 such as a bolt, washer, and a nut. This arrangement permits the abrasive stone 20 to be adjusted relative to the bellcrank 21 to insure that the abrasive stone 20 makes the desired contact with the raised tip portions 19 of the contact blades 18 during relative movement therebetween. Since the abrasive stone 20 is supported on the index head 10, the abrasive stone 20 moves while the contact blades 18 are fixed.

The abrasive stone 20 has its surface, which engages the raised tip portions 19 of the contact blades 18, formed as part of a cylinder of a relatively large radius so that the surface of the abrasive stone 20 is almost straight. This arrangement permits the abrasive stone 20 to initially engage the raised tip portions 19 of the contact blades 18 at a low pressure angle. This insures that the raised tip portions 19 of the contact blades 18 remain flat and sharp edged to provide good electrical contact with each of the chips 12.

Since one or more stations (e.g. the vibratory feed bowl 14, the orientor station 15, and the sorter 16) have obstructions that would engage the abrasive stone 20 during rotation of the index head 10, it is necessary to raise or lift the abrasive stone 20 over these obstructions. Accordingly, the support structure that fixedly mounts the contact blades 18 relative to the head 10 has a cam 28 fixedly supported thereon. The bellcrank 21 has a roller 29, which functions as a cam follower, mounted on the opposite side of its arm from the U-shaped member 25 for cooperation with the surface of the cam 28.

A spring 30 continuously urges the roller 29 into engagement with the upper cam surface of the cam 28. The spring 30 has one end attached to the bellcrank 21 and its other end fixed to a bracket 31 on the index head 10. Accordingly, whenever the surface of the cam 28 has a rise, the abrasive stone 20 is lifted upwardly to pass over the obstruction at one of the work stations.

Figure 2:
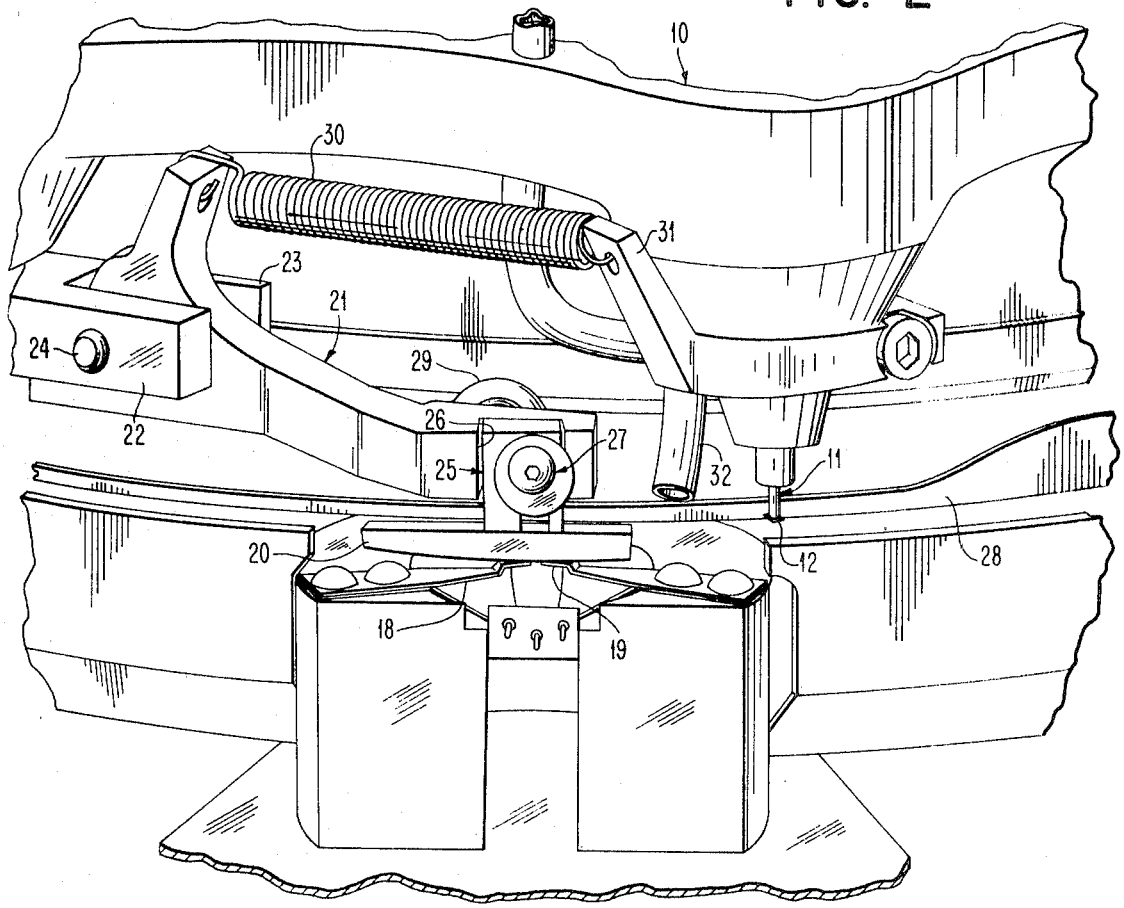
FIG. 2 is a side-elevational view of a portion of an index head with the cleaning device at one of the test stations.

After the raised tip portions 19 of the contact blades 18 have been cleaned by the abrasive stone 20 passing thereover, it is necessary to remove any debris accumulated on the contact blades 18 due to cleaning by the abrasive stone 20. Accordingly, the index head 10 carries an air jet nozzle 32 rearwardly of the abrasive stone 20 as shown in FIG. 2. The air is supplied from a vacuum distributor of a type such as that particularly shown and described in the aforesaid Aronstein et al. patent. Thus, the distributor is capable of providing both positive air pressure to the air nozzle 32 and vacuum to the vacuum needles 11. Means also is provided to control the supply of air to the nozzle 32 to insure that the air through the air jet nozzle 32 is supplied only when the air jet nozzle 32 is disposed adjacent the contact blades 18.

Considering the operation of the present invention, the index head 10 is rotated from one of the work or test stations to the next after a predetermined interval of time in which the chip 12 has work or tests performed thereon. During each cycle of operation, the abrasive stone 20 engages the raised tip portions 19 of the contact blades 18 of each of the test stations 17. This results in any contaminants, which are collected on the raised tip portions 19 of the contact blades 18 from the chips 12, being removed. As the abrasive stone 20 ceases engagement with the contact blades 18, air is supplied through the nozzle 32 to remove the debris from the blades 18. This insures that there can be no short between the chip 12 and the contact blades 18 due to the debris.

Whenever one of the work stations is approached in which there is an obstruction to the abrasive stone 20 when it is positioned for cleaning, the upper surface of the cam 28 has a rise to lift the abrasive stone 20 so that it will not engage the obstruction at the work station. Then, as soon as the work station has been passed by the roller 29 riding on a high dwell of the surface of the cam 28, the upper surface of the cam 28 falls to allow the abrasive stone 20 to again return to the position in which it will engage the raised tip portions 19 of the contact blades 18. Thus, it is only necessary to raise the abrasive stone 20 whenever there is structure of the work station disposed in the path of the abrasive stone 20 in which it engages the raised tip portions 19 of the contact blades 18.

After each of the chips 12 has been supplied to the vacuum needle 11 from the vibratory feed bowl 14 and then properly oriented by the orientor 15, the chip 12 is transported to each of the test stations 17 for testing. At the completion of the tests, the sorter 16 determines whether the chip 12, which is removed at the sorter 16 from the vacuum needle 11, is to be disposed in the accepted or rejected area of the sorter 16 depending on the signal supplied to the sorter 16 from a logic circuit which has received signals from each of the test stations 17 as to whether the chip 12 passed or failed the tests.

It should be understood that the vacuum needle 11 is lowered at each of the work stations and at each of the test stations 17. The vacuum needle 11 is raised during transport between each of the various stations to clear any obstructions.

While the means for cleaning the raised tip portions 19 of the contact blades 18 has been described as an abrasive member such as the stone 20, it should be understood that any other suitable means for removing the contaminants on the contact blades 18 may be employed. For example, the raised tip portions 19 of the contact blades 18 could be cleaned by a pad wetted with a cleaning chemical or a brush.

Furthermore, the debris could be removed from the raised tip portions 19 of the contact blades 18 by other suitable means than the air jet nozzle 32. For example, a rotary or stationary brush could be utilized to remove the debris from the raised tip portions 19 of the contact blades 18.

While the present invention has been described as cleaning the contact blades 18 during each cycle of the rotary index head 10, it should be understood that cleaning during every cycle need not necessarily be performed unless such is required. Thus, suitable means could be employed to lock the bellcrank 21, for example, in a position in which the abrasive stone 20 would be elevated so as not to engage the raised tip portions 19 of the contact blades 18 during each cycle. Likewise, the contact blades 18 at some of the test stations 17 might be cleaned every cycle while the contact blades 18 at other of the test stations 17 would only be cleaned in intermittent cycles.

While three of the contact blades 18 have been shown, it should be understood that any number of the contact blades from one might be employed. The same number of the contact blades 18 need not necessarily be disposed at each of the test stations 17. This would depend upon the test to be performed on the chip 12 at the particular test station 17.

An advantage of this invention is that it insures that contacts do not become contaminated from the devices being tested. Another advantage of this invention is that better tests of the devices to be tested are obtained since there are no contaminants accumulated on the contact to affect its resistance. A further advantage of this invention is that the cost of cleaning is reduced through lowering the required manpower. Still another advantage of this invention is that the cost of testing the chips is reduced since there is no downtime required for cleaning the contacts of the test stations. A still further advantage of this invention is that better cleaning quality of the contacts is obtained. Yet another advantage of this invention is that the contacts remain flat and sharp edged without progressively increasing or decreasing the contact area even though cleaned with an abrasive.

While the invention has been particularly shown and described with reference to a preferred embodiment thereof, it will be understood by those skilled in the art that various changes in form and details may be made therein without departing from the spirit and scope of the invention.

What is claimed is:

1. In combination:
   at least one test station for testing an electrical device or the like;
   said station including at least one electrical contact for engaging an electrical connection on the device to be tested;
   abrasive means to clean the contact;
   means to transport the electrical device to and from the test station;
   said transporting means carrying said abrasive means so as to produce relative movement between said abrasive means and the contact whereby the contact is abrasively cleaned;
   means for picking up and releasably holding the electrical device on said transporting means;
   means for releasing the electrical device from said transporting means after testing of the device has been completed;
   means to automatically remove any debris after said abrasive means has cleaned the contact;
   and said transporting means carrying said removal means so as to produce relative movement between said removal means and the contact to dispose said removal means for cooperation with the contact after said abrasive means has cleaned the contact and said abrasive means has been moved away from the contact by said transporting means.

2. The combination according to claim 1 in which:
   said transporting means includes means supporting said abrasive means and said removal means in spaced relation to each other;
   and said transporting means moves said supporting means relative to the contact to move said abrasive means away from the contact before said removal means is disposed to remove any debris from the contact.

3. The combination according to claim 2 in which said transporting means moves said supporting means in a continuous path in the same direction.

4. The combination according to claim 2 in which said transporting means rotates said supporting means in a continuous rotary path in one rotary direction.

5. The combination according to claim 1 in which said means comprises an air jet directing air onto the contact after said abrasive means has cleaned the contact and said abrasive means has been moved relative to the contact by said transporting means.

6. The combination according to claim 5 in which:
said transporting means includes means supporting said abrasive means and said air jet in spaced relation to each other;
and said transporting means moves said supporting means relative to the contact to move said abrasive means away from the contact before said removal means is disposed to remove any debris from the contact.

7. The combination according to claim 1 in which said abrasive means comprises an abrasive stone, said stone being a segment of a cylinder of relatively large radius whereby the surface of the cleaned contact is maintained flat and sharp edged.

8. In combination:
at least one station for testing an electrical device or the like;
said station including at least one electrical contact for engaging an electrical connection on the device to be tested, said contact having an active tip at its end to engage the electrical connection on the device to be tested;
means to transport the electrical device to and from the test station;
means to pick up and releasably hold the electrical device on said transporting means;
means to release the electrical device after testing is completed;
means to clean the active tip of said contact, said cleaning means being carried by said transporting means for movement therewith past said contact in one direction;
and said contact being fixed against movement in the one direction in which said cleaning means moves with said transporting means.

9. The combination according to claim 8 including means to remove any debris from said contact after said cleaning means has been cleaned the active tip of said contact and been moved away from said contact, said removal means being carried by said transporting means and being separate from said cleaning means.

10. The combination according to claim 9 including:
a plurality of test stations with each including at least one contact, said tips of said contacts of said test stations being disposed in the same plane;
and said transporting means moving each of the electrical devices to be tested from one of said stations to the next in sequence;
said contact of each of said stations being fixed against movement in the direction in which said cleaning means moves with said transporting means.

11. The combination according to claim 9 in which said cleaning means is an abrasive means.

12. The combination according to claim 11 in which said abrasive means comprises an abrasive stone, said stone being a segment of a cylinder of relatively large radius so as to maintain the surface of said tip of said contact flat and sharp edged.

13. The combination according to claim 12 in which said removal means comprises an air jet directing air onto said contact after said cleaning means has cleaned said contact and been moved away from said contact by said transporting means.

14. The combination according to claim 10 in which said removal means comprises an air jet directing air onto said contact after said cleaning means has cleaned said contact and been moved away from said contact by said transporting means.

15. In combination:
a plurality of test stations for testing an electrical device or the like;
each of said test stations including at least one electrical contact for engaging an electrical connection on the device to be tested, said contact having an active tip at its end to engage the electrical connection on the device to be tested;
said tips of said contacts of said test station being disposed in the same plane;
at least one work station in addition to said test stations;
said work station having structure disposed in the same plane as said tips of said contacts of said test stations;
means to transport each of the electrical devices to be tested from one of said stations to the next in sequence;
means to clean the active tip of each of said contacts, said cleaning means being carried by said transporting means;
means to remove any debris from said contact after said cleaning means has cleaned the active tip of said contact, said removal means being carried by said transporting means;
and cam means cooperating with said cleaning means to move said cleaning means out of the plane in which said cleaning means cleans said contacts when said cleaning means passes said work station whereby said cleaning means cannot engage the structure of said work station in the same plane as said tips of said contacts of said test stations.

16. The combination according to claim 15 in which said transporting means moves in a continuous path.

17. The combination according to claim 15 in which said transporting means rotates in a continuous rotary path.

* * * * *